(12) United States Patent
Patrick et al.

(10) Patent No.: US 11,487,350 B2
(45) Date of Patent: Nov. 1, 2022

(54) DYNAMICALLY REPRESENTING A CHANGING ENVIRONMENT OVER A COMMUNICATIONS CHANNEL

(71) Applicant: General Electric Company, Schenectady, NY (US)

(72) Inventors: Romano Patrick, Niskayuna, NY (US); John Hoare, Latham, NY (US); Justin Foehner, Penfield, NY (US); Steven Gray, Niskayuna, NY (US); Shiraj Sen, Clifton Park, NY (US); Huan Tan, Clifton Park, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 791 days.

(21) Appl. No.: 15/860,367

(22) Filed: Jan. 2, 2018

(65) Prior Publication Data

US 2019/0202059 A1    Jul. 4, 2019

(51) Int. Cl.
| | |
|---|---|
| *G06F 3/01* | (2006.01) |
| *G05D 1/00* | (2006.01) |
| *G06V 30/24* | (2022.01) |
| *B25J 9/16* | (2006.01) |

(52) U.S. Cl.
CPC ............ *G06F 3/011* (2013.01); *G05D 1/0044* (2013.01); *G06V 30/2504* (2022.01); *B25J 9/1679* (2013.01); *Y10S 901/44* (2013.01)

(58) Field of Classification Search
CPC . B25J 9/1679; G05D 1/0044; G06K 9/00664; G06K 9/34; G06K 9/6857; G06F 3/011; Y10S 901/44; Y10S 9901/44; F03D 17/00; G06V 30/2504
See application file for complete search history.

(56) References Cited

U.S. PATENT DOCUMENTS

| | | |
|---|---|---|
| 9,132,342 B2 | 9/2015 | Balachandreswaran et al. |
| 9,541,673 B2 | 1/2017 | Baek et al. |
| 10,497,177 B1 * | 12/2019 | Cote ....................... G06T 17/20 |

(Continued)

FOREIGN PATENT DOCUMENTS

| | | |
|---|---|---|
| CN | 103513295 A | 1/2014 |
| CN | 106600705 A | 4/2017 |

OTHER PUBLICATIONS

Ohba, Kohtaro, et al.; "Real-time micro-environmental observation with virtual reality", Proceedings 15th International Conference on Pattern Recognition, vol. No. 04, pp. 487-490, Sep. 3-7, 2000, Barcelona.

(Continued)

*Primary Examiner* — Chuen-Meei Gan
(74) *Attorney, Agent, or Firm* — Fletcher Yoder, P.C.

(57) ABSTRACT

In accordance with certain implementations of the present approach, a reduced, element-by-element, data set is transmitted between a robot having a sensor suite and a control system remote from the robot that is configured to display a representation of the environment local to the robot. Such a scheme may be useful in allowing a human operator remote from the robot to perform an inspection using the robot while the robot is on-site with an asset and the operator is off-site. In accordance with the present approach, an accurate representation of the environment in which the robot is situated is provided for the operator to interact with.

20 Claims, 7 Drawing Sheets

(56) References Cited

U.S. PATENT DOCUMENTS

| | | |
|---|---|---|
| 2008/0310707 A1 | 12/2008 | Kansal et al. |
| 2009/0076665 A1* | 3/2009 | Hoisington .......... G05D 1/0044 |
| | | 701/2 |
| 2009/0276105 A1* | 11/2009 | Lacaze ................. G05D 1/0206 |
| | | 701/2 |
| 2014/0200863 A1* | 7/2014 | Kamat ................... G06T 19/00 |
| | | 703/1 |
| 2015/0273693 A1* | 10/2015 | Cohen .................... B25J 9/1661 |
| | | 700/253 |
| 2017/0177937 A1* | 6/2017 | Harmsen ................ G06T 17/05 |
| 2017/0220887 A1* | 8/2017 | Fathi .................. G06K 9/00208 |
| 2017/0243403 A1 | 8/2017 | Daniels et al. |
| 2017/0247108 A1* | 8/2017 | Ljubuncic ............ G06K 9/2063 |
| 2017/0277180 A1* | 9/2017 | Baer ..................... G01S 17/933 |
| 2018/0041907 A1* | 2/2018 | Terry ..................... G06T 19/00 |
| 2018/0149138 A1* | 5/2018 | Thiercelin ............... F03D 80/50 |

OTHER PUBLICATIONS

Tatzgern, Markus, et al.; "Transitional Augmented Reality navigation for live captured scenes", 2014 IEEE Virtual Reality (VR), pp. 21-26, Mar. 29-Apr. 2, 2014, Minneapolis.

* cited by examiner

DYNAMICALLY REPRESENTING A CHANGING ENVIRONMENT OVER A COMMUNICATIONS CHANNEL

BACKGROUND

The subject matter disclosed herein relates to asset inspection, and more specifically to coordinating the inspection of one or more assets by one or more robots.

Various entities may own or maintain different types of assets as part of their operation. Such assets may include physical or mechanical devices, structures, or facilities which may, in some instances, have electrical and/or chemical aspects as well. Such assets may be used or maintained for a variety of purposes and may be characterized as capital infrastructure, inventory, or by other nomenclature depending on the context. For example, assets may include distributed assets, such as a pipeline or an electrical grid as well as individual or discrete assets, such as an airplane, a wind turbine generator, a radio tower, a steam or smoke stack or chimney, a bridge or other structure, a vehicle, and so forth. Assets may be subject to various types of defects (e.g., spontaneous mechanical defects, electrical defects, as well as routine wear-and-tear) that may impact their operation. For example, over time, the asset may undergo corrosion or cracking due to weather or may exhibit deteriorating performance or efficiency due to the wear or failure of component parts.

While inspection using on-site human agents is common, in some circumstances an inspection may be performed or facilitated using an automated or remote-controlled mechanism, such as an industrial inspection device that collects data autonomously or semi-autonomously for an asset. Such approaches may be particularly useful for inspecting or monitoring remote assets or assets where on-site personnel are not typically maintained. By way of example, the robot or drone may move relative to the asset, either automatically or under human control, and collect data continuously or at waypoints along the path.

One issue that may arise in the context of fully or partially human controlled inspection robots, however, is the quantity of data that may need to be conveyed to the controlling human in a near-real time manner to facilitate observation of the environment by the human and the control of the robot by the human.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible embodiments. Indeed, the disclosure may encompass a variety of forms that may be similar to or different from the embodiments set forth below.

In one embodiment, an asset inspection system is provided. In accordance with this embodiment, the asset inspection system includes at least a robot configured to be operated from a remote location. The robot includes at least: one or more sensors and a processing component configured to receive sensed data from the one or more sensors and to generate and maintain a dynamic model based on at least the sensed data. Maintaining the dynamic model comprises repeatedly comparing an updated model and a reference model to identify element-by-element changes to the dynamic model over time. The robot also includes at least a communication interface configured to communicate the element-by-element changes to the remote location. The asset inspection system also includes at least a second simulator at the remote location, the second simulator configured to maintain a remote model based on the dynamic model and on the element-by-element changes sent by the robot.

In a further embodiment, a method is provided for monitoring a remote robot. In accordance with this embodiment, the method includes generating and maintaining a dynamic model based at least on sensed data acquired by one or more sensors of a robot. Maintaining the dynamic model comprises repeatedly comparing an updated model and a reference model to identify element-by-element changes to the dynamic model over time. The element-by-element changes are communicated to a remote location. A remote model at the remote location is maintained based on the dynamic model and on the element-by-element changes sent by the robot.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
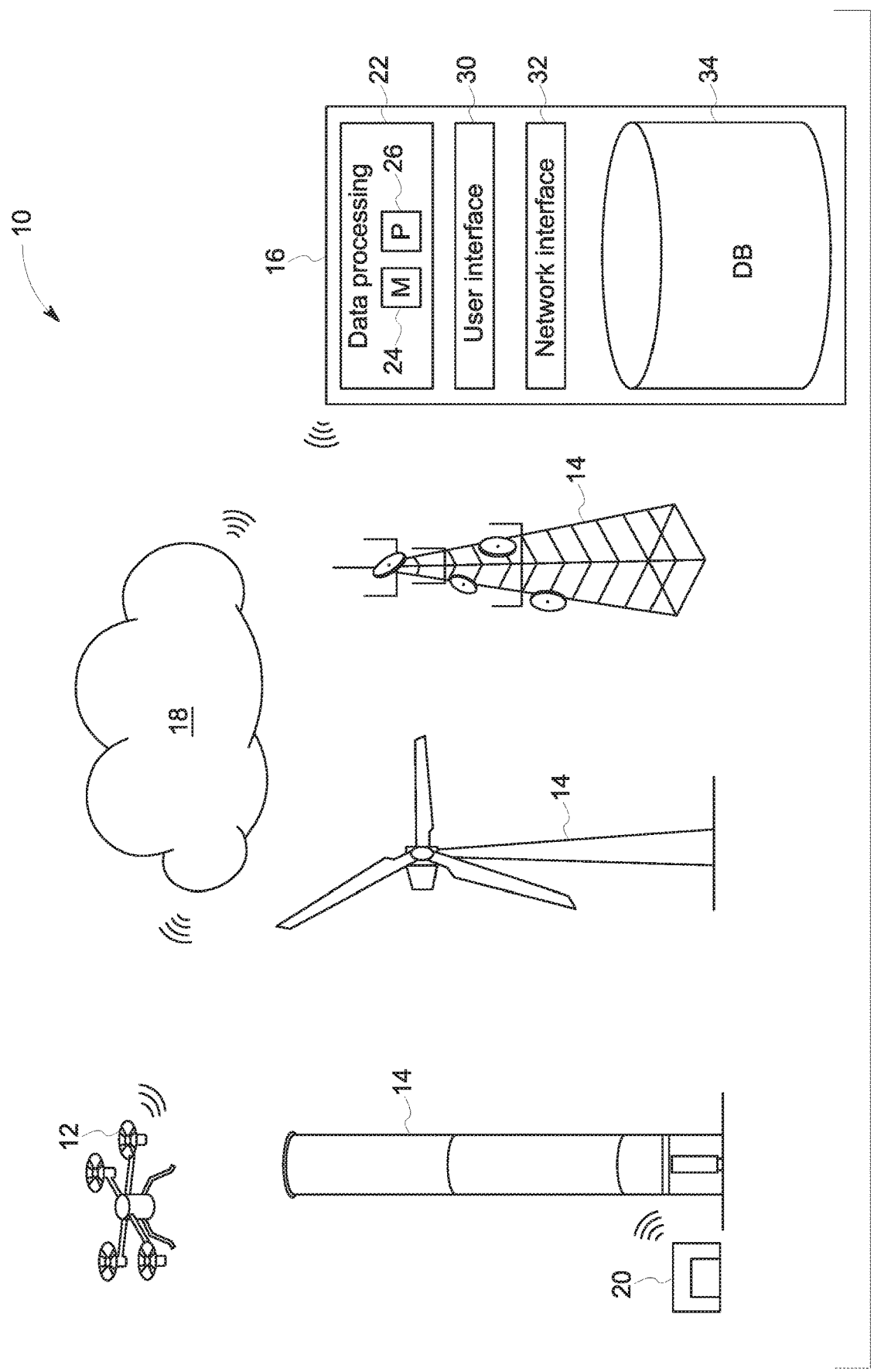
FIG. 1 illustrates an asset inspection system and various types of assets suitable for inspection, in accordance with aspects of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

In accordance with certain implementations of the present approach, data is transmitted between a robot having a sensor suite and a control system remote from the robot and configured to both issue commands to the robot and display a representation of the environment local to the robot. Such a scheme may be useful in allowing a human operator remote from the robot to perform an inspection using the robot while the robot is on-site with an asset and the operator is off-site. In accordance with the present approach, an accurate representation of the environment in which the robot is situated is provided for the operator to interact with.

By way of example, in one implementation the representation of the environment local to the robot may be presented as a virtual reality (VR) environment or simulation with which an operator may observe and interact to effect operation of the robot in the represented environment (e.g., movement, rotation, sensing, manipulation of controls or objects, actuation of robot appendages or grippers, and so forth).

Such a simulation enables the operator to control the robot with substantial accuracy and perform highly complex and precise tasks since the human operator is provided with a detailed representation of the environment where the robot is located. As may be appreciated, a virtual reality simulation or representation of this type may rely on or be constructed using large amounts of data (e.g. still and video images, point clouds, spectral data such as infrared or ultraviolet spectrum images, spectroscopy data, sounds, and so forth) acquired in the environment local to the robot (i.e., in the range of sensors on the robot). This sensor data acquired by the robot may then be used to recreate a representation of the environment as sensed from the perspective of the robot, so that the human operator experiences in the simulation (e.g., VR) the sensations (visual, auditory, motive, and so forth) that the operator would perceive if in the location and orientation where the robot is located. If the environment in the sensory range of the robot changes, the simulated environment (VR) is updated to represent these changes. In such an implementation, because the amount of information that may be needed to simulate an environment accurately may be large, the latency of the communications link or network between the sensors present on the robot and the simulation presented to the remote operator can impact the ability of the representation system (e.g., VR system) to quickly and accurately represent changes in the robot's environment within the simulation.

To prevent the limitations imposed by a high latency communications bridge from impacting the ability of a human operator from controlling the robot effectively, the present approach reduces the amount of data that needs to be transmitted between the robot and operator locations. In particular, by reducing the amount of data transferred to maintain and update the representation, it is possible to update the representation or simulation more quickly and accurately when changes occur in the environment sensed by the robot. In this manner, such a remote representation scheme may thereby be implemented as an effective tool for a human operator to control a remote robot even in circumstances where the communications bridge exhibits high latency.

The present approach is in contrast to other approaches, such as techniques employing data compression algorithms, which are generally insufficient to manage the extremely large quantities of data needed in VR simulation. Another conventional approach is to sub-select sensors for model update operations depending on context or actions. However, such an approach creates a risk that conditions of interest or risk may not be observed or perceived by the human operator because the data from sensors that detect them is being temporarily suppressed. The present approach is distinct from these techniques and addresses their shortcomings.

As used herein, unmanned or robotic devices, such as ground-based mobile robots, including those with legs, wheels, tracks, etc., unmanned aerial vehicles (UAVs), including fixed wing and rotary wing vehicles, unmanned submersible vehicles (USVs), which may swim or move along the floor of the body of liquid, or other autonomously moving vehicles that may be characterized as drones or robots. For simplicity, to the extent the terms "drone" and "robot" are used herein, though it should be appreciated that this terminology is intended to encompass all variations of UAVs, USVs, robotic devices, and so forth that are capable of programmable movement with no or limited human oversight or of remote control by a human operator. Such programmable movement, when employed, can be based on either locally generated path waypoints or guidance or path guidance and waypoints generated by a remote system and communicated to the robot. Thus, as used herein, such devices move during an operational phase or period entirely or primarily without direct human intervention or control, with limited or partial human intervention or oversight, and/or with full control by a human operator. In accordance with present approaches, such devices may be operated to move along a flight plan, along which the devices acquire inspection data, such as video or still image data, LIDAR data, acoustic data, spectroscopic data, temperature or pressure data, or other data that can be acquired by sensors or cameras that can be affixed to a device moving along the flight plan and appropriate to the type of monitoring or inspection being performed. The positions and orientations of the sensors can typically be adjusted based on operator judgement when an operator is involved in the operation of the robot and/or on the robot's own situational awareness. The sensory information can be collected synchronously or asynchronously. In general, inspections using such robots may be performed on one or more assets including, but not limited to, power generation assets, communication assets, transportation assets, mining or underground pumping assets, manufacture or construction assets and so forth.

To the extent the phrase "flight plan" is used herein, it should be appreciated that this phrase does not necessitate aerial movement, but instead relates to any one-dimensional (1D) (such as along a track), two-dimensional (2D) (such as along a defined or undefined planar route), or three-dimensional (3D) (such as movement in the air, under water, or on a structure in where depth or altitude is also traversable), or four-dimensional (4D) (such as where there are defined temporal aspects that may characterize a velocity, acceleration, or a time on station at a waypoint) path or route along which a drone moves as part of an inspection plan, either as part of an automated process or while under the control of a human operator. Thus, a "flight plan" as used herein may be characterized as any 1D, 2D, 3D, or 4D route or path along which device such as a drone or robot is moved to perform a sensor-based inspection of an asset. Such a path may be adaptive, as discussed herein, and may consist of one or more waypoints along which the robot proceeds in an ordered fashion, with the sequence and location of the waypoints defining the path or route. It should be appreciated that such a flight plan may also incorporate not only temporal and/or spatial locations, but also orientation and/or alignment instructions for movement along the path and/or to exhibit at a given waypoint. Thus, the flight plan may also specify parameters such as roll, pitch, and yaw for the drone to exhibit at different points along the flight plan as well as two- or three-dimensional alignment characteristics that may relate to the direction in which a sensor or camera is pointing at a point along the flight plan. Thus, the flight plan may address not only where or when a robot is with respect to an inspection site but, at a given location or waypoint, the direction the robot is facing or otherwise oriented with respect to. Further, even at the same waypoint and orientation, images may be acquired at different magnifications, wavelengths, or other optical parameter such that effectively the image constitutes a different view.

To facilitate explanation and provide useful real-world context, various examples of assets that may be inspected, such as wind turbine generators, radio transmission towers, smokestacks, and so forth, may be provided herein. It should be appreciated however that such examples are provided merely to facilitate explanation, and the present approach is suitable for use with a wide range of other assets and at various other types of sites or monitoring contexts. Thus, the present approach is not intended to be limited to the context of the present examples.

With the preceding in mind, and turning to the figures, FIG. 1 depicts aspects of an inspection system 10 employing one or more robots 12 suitable for inspecting one or more assets 14, such as a wind turbine generator, radio tower, smokestack, or other suitable asset.

In the depicted example a remote server or servers 16, accessible via a cloud 18 (e.g., a network interface for accessing one or more remote servers virtual machines, etc. for storage, computing, or other functionality) are depicted. Such servers 16 may communicate with the one or more robots 12 to coordinate operation of one or more robots 12, such as for inspection of an asset 14. In one embodiment, the robot(s) 12 have onboard cellular or network connectivity and can communicate with the remote server 16 prior to beginning, during, and/or after an inspection. In certain implementations the cellular or network connectivity of the robot(s) 12 allow communication during an inspection, allowing inspection data (e.g., sensor data) to be communicated to the remote server 16 and/or allowing the remote server 16 to communicate instructions to a given robot 12. In some instances, changes to a flight plan may be determined by a processor internal to the robot 12, i.e., onboard, such as in the event the robot 12 is operating outside of communication range from the remote server 16.

As shown, in some embodiments, the system may also include a docking station 20 (e.g., robot garage), disposed on or near the asset 14, for short term or long term storage of the robot 12 before and/or after inspection. In some embodiments, the docking station 20 may be in communication with the remote server 16 via the cloud 18. If the robot 12 relies on a battery for power, the docking station 20 may also include a power source for charging the robot's 12 battery.

In the depicted example, the remote server 16 is a remote computing device in communication with the robot(s) 12 via the cloud 18. Though only a single remote server 16 is shown in FIG. 1, it should be understood that the functions performed by the remote server 16 may be performed by multiple remote servers 16 and/or by virtualized instances of a server environment. In the instant embodiment, the remote server 16 includes a data processing system 22, which may include a memory component 24 and a processor 26, for processing data received from the robot 12 and/or instructions to be relayed to the robot 12. As is described in more detail below, in some embodiments, the robot 12 may provide sensor data to the remote server 16 for processing into a representation of the environment currently sensed by the robot 12 with which an operator may then interact. By interacting with the environment the operator may in turn generate instructions that are then conveyed to the robot 12.

The remote server(s) 16 are also depicted as including a user interface by which a user may remotely issue instructions or commands to the server(s) 16. As noted above, the user interface may present or include a representation of the sensed environment local to the robot 12 with which the operator interacts (e.g., a VR interface). Instructions or commands generated by interaction with the interface may in turn be acted upon by the remote server 16 to control an aspect of the operation of the robot 12 or to control or change an aspect of the receipt, processing, and/or transmission of data generated by the robot 12. In addition, the remote server(s) 16 are depicted as including a network interface 32 that may be used to communicate with other components of an overall inspection system (such as other servers 16, a robot 12, storage devices, processing components, and so forth) over a local network, a wide area network, the Internet, and so forth.

During an inspection, the robot 12 may send sensor data to the remote server(s) 16 for one or more of processing, storage, or presentation in a real-time or near real-time manner, as discussed in greater detail below. By way of example, videos, images, LIDAR data, depth sensor data, acoustic data, spectroscopic data, or other relevant sensor or camera data acquired by the one or more robots 12 during an inspection may be presented to a user as part of an interactive representation, such as the VR interface mentioned above.

In the depicted example, the data processing system 22 and the database 34 are depicted as part of a single or common processor-based system. However, the depicted functionalities, as well as other functionalities discussed herein, may be implemented in a distributed or dispersed manner, with certain aspects being local to the asset 14, to the robot 12, to an operational facility and/or other locations remote from the asset 14. In such distributed implementations, the depicted aspects may still be communicatively linked, such as over one or more network connections, as discussed herein.

Figure 2:
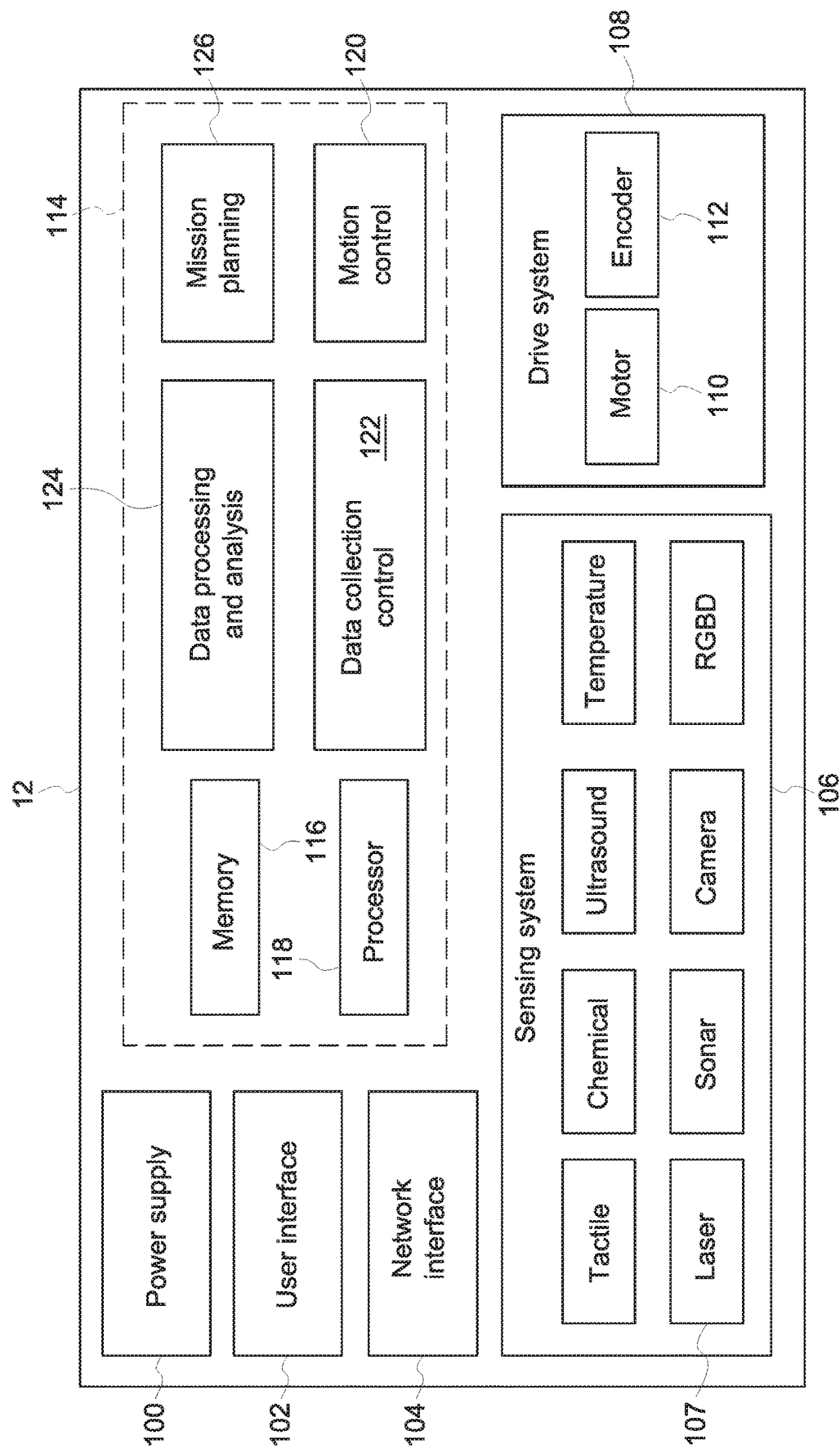
FIG. 2 is a schematic of a robot of the asset inspection system of FIG. 1, in accordance with aspects of the present disclosure.

FIG. 2 is a schematic of an embodiment of the robot 12 shown in FIG. 1. It should be understood, however, that other embodiments of the robot 12 are envisaged having additional components, fewer components, and/or different combinations of components. As shown, the robot 12 includes a power supply 100 to provide power for the operation of the robot 12. The power supply 100 may include a replaceable or rechargeable battery, a combustion engine, a generator, and electric motor, a solar panel, a chemical-reaction based power generation system, etc., or some combination thereof.

The robot may include a user interface 102, by which a user may set up or adjust various settings of the robot 12. The user interface may include one or more input devices (e.g., knobs, buttons, switches, dials, etc.) and in some cases may include a display (e.g., a screen, array of LEDs, etc.) for providing feedback to the user.

A network interface 104 enables communication with the remote server 16 via the cloud 18, or other devices (e.g., the docking station 20, a remote controller, a smart phone, a computing device, a tablet, etc.). For example, the network interface 104 may enable communication via a wireless network connection, a wired network connection, cellular data service, Bluetooth, Near Field Communication (NFC), ZigBee, ANT+, or some other communication protocol.

A sensing system 106 may include one or more sensors 107 (e.g., tactile, chemical, ultrasound, temperature, laser, sonar, camera, a red, blue, green, depth (RGB-D) camera, etc.) configured to sense various qualities and collect data during an inspection of an asset. As discussed herein, the sensors 107 may be used to acquire sensed data corresponding to the sensor type and observation range that conveys information about the environment where the robot 12 is located.

A drive system 108 may actuate movement of the robot 12 through the air, through a liquid, along a surface, or some combination thereof. As shown, the drive system 108 may include one or more motors 110 and one or more encoders 112. The one or more motors 110 may drive propellers, legs, wheels, tracks, etc. The one or more encoders 112 may sense one or more parameters of the one or more motors 110 (e.g., rotational speed) and provide data to a control system 114.

The control system 114 may include one or more memory components 116 and one or more processors 118. A motion control system 120 may receive a signal from the one or more encoders 112 of the drive system 108 and output a control signal to the one or more motors 110 to control the movement of the robot 12. Similarly, a data collection control system 122 may control the operation of the sensing system 106 and receive data from the sensing system 106. The communication interface between the sensors 107 and the on-board processor 118 may be a standard industrial interface, including parallel bus, serial bus (I2C, SPI), and USB. A data processing and analysis system 124 may receive data collected by the sensing system 106 and process or analyze the collected data. In some embodiments, the data processing and analysis system 124 may process and analyze the data to different extents, such as based on a sensor modality and/or based on network communication or transmission related criteria, such as network latency, available bandwidth, and so forth.

In certain embodiments, the data processing and analysis system 124 may perform pre-processing of the sensor data or a partial processing and analysis of the sensor data and then provide the sensor data for transmission to a remote server 16 for further processing, analysis, and/or display, such as in part of a VR representation of the environment in which the robot is located. In further embodiments, the robot 12 may transmit raw sensor data to the remote server 16 for such uses.

The control system 114 may also include a mission planning component 126 that may autonomously or in coordination with a remote server 16 generate or update a mission plan and executes the mission plan by coordinating the various other components of the control system 114 and the robot 12. In embodiments discussed herein, such mission planning may be subject to override by a remote operator and/or may account for only a portion of an inspection routine, such as moving the robot to the asset location or between way points which, once reached, may allow for remote operator control. Alternatively, in other embodiments, the inspection routine may be largely automated and/or under control of the mission planning functionality and the review and of a representation of the environment in which the robot is located by a remote operator (such as via VR) may be more passive in nature, with limited control options.

Figure 3:
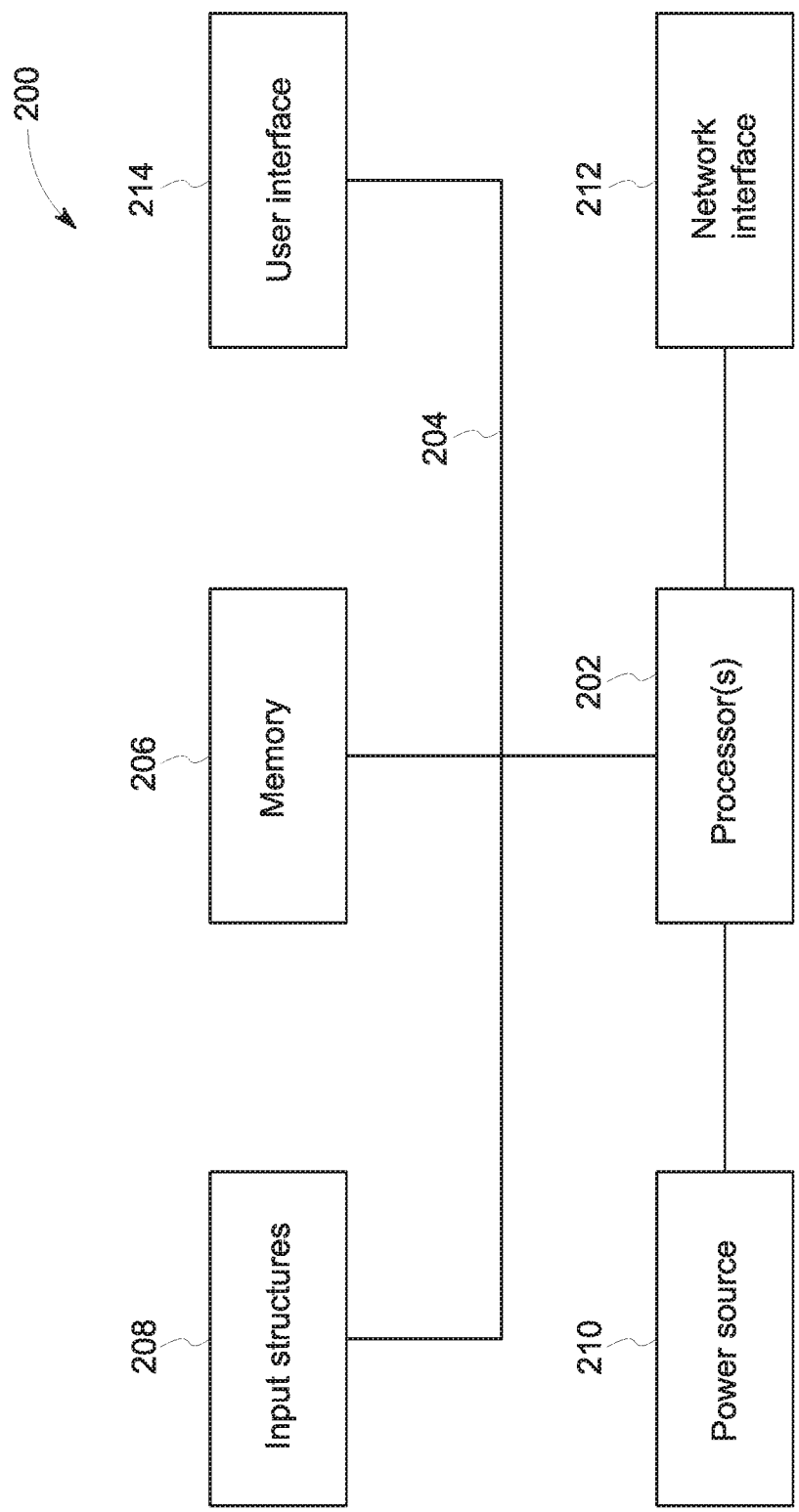
FIG. 3 is a block diagram of a processor based system suitable for use with the asset inspection system of FIG. 1, in accordance with aspects of the present disclosure.

FIG. 3 generally illustrates a block diagram of example components of a computing device 200 that could be used as a remote server 16. As used herein, a computing device 200 may be implemented as one or more computing systems including laptop, notebook, desktop, tablet, or workstation computers, as well as server type devices or portable, communication type devices, such a cellular telephones, and/or other suitable computing devices.

As illustrated, the computing device 200 may include various hardware components, such as one or more processors 202, one or more busses 204, memory 206, input structures 208, a power source 210, a network interface 212, a user interface 214, and/or other computer components useful in performing the functions described herein.

The one or more processors 202 are, in certain implementations, microprocessors (e.g., CPUs. GPUs. and so forth) configured to execute instructions stored in the memory 206 or other accessible locations. Alternatively, the one or more processors 202 may be implemented as application-specific integrated circuits (ASICs), field-programmable gate arrays (FPGAs), and/or other devices designed to perform functions discussed herein in a dedicated manner. As will be appreciated, multiple processors 202 or processing components may be used to perform functions discussed herein in a distributed or parallel manner.

The memory 206 may encompass any tangible, non-transitory medium for storing data or executable routines, including volatile memory, non-volatile memory, or any combination thereof Although shown for convenience as a single block in FIG. 3, the memory 206 may actually encompass various discrete media or types of media in the same or different physical locations. The one or more processors 202 may access data in the memory 206 via one or more busses 204.

The input structures 208 are used to allow a user to input data and/or commands to the device 200 and may include mice, touchpads, touchscreens, keyboards, VR controllers, motion or optical sensors, microphones, and so forth. The power source 210 can be any suitable source for providing power to the various components of the computing device 200, including line and battery power. In the depicted example, the device 200 includes a network interface 212. Such a network interface 212 may allow communication with other devices on a network using one or more communication protocols.

In the depicted example, the device 200 includes a user interface 214, such as a display configured to display images or data and/or speakers configured to play sound or acoustic data provided by the one or more processors 202. By way of example, the user interface 214 may encompass a display panel used to display a representation of the environment in which the robot 12 is currently located where the representation is generated based on sensor data provided by the robot 12. Similarly, the user interface 214 may include speakers or headphones used to provide an audio portion of such a representation generated based on acoustic sensor data provided by the robot 12. In one implementation, the user interface 214 may be a virtual reality (VR) headset worn by an operator and used to provide a VR representation (which may or may not include an audio aspect) to an operator to interact with.

As will be appreciated, in a real-world context a processor-based system, such as the computing device 200 of FIG. 3, may be employed to implement some or all of the present approach, such as performing the functions of a remote server 16 shown in FIG. 1 or other processing devices used operating or monitoring a robot 12 used in an inspection process.

Figure 4:
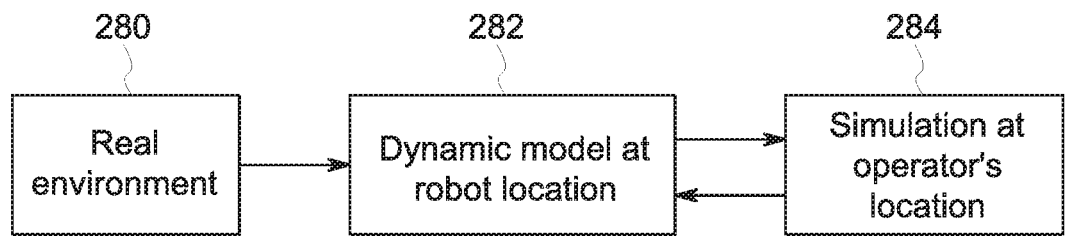
FIG. 4 depicts a block figure of the respective environments and models of a robotic tele-operation, in accordance with aspects of the present disclosure.

With the preceding context in mind, the present approach relates to facilitating remote operation of a robot 12, such as in an inspection or monitoring operation, where sensor data acquired by the robot is used to generate a representation of the environment in which the robot is located. An operator may then observe and/or interact with the representation, such as a VR representation, to operate the robot. With this in mind, and turning to FIG. 4, the present approach distinguishes between three environments: (1) the actual or real environment 280 at the location of the robot, (2) a simulated environment 282 at the location of the robot (referred to as the "dynamic model" or "local model" herein), and (3) a simulated environment 284 at the location of the operator (which may be referred to as a "VR model", "VR simulation", "remote model", or "operator model"). It should be appreciated throughout that, though certain examples may be presented in the context of virtual reality or VR, any representation capable of presentation to an operator is encompassed, including displays of a representation on a conventional display, augmented reality (AR) type displays, and other representation that may fall short of a full virtual reality type experience. That is, in the present context the remote model may be understood to encompass any representation scheme capable of representing a model of the environment in which the robot is located based on sensor data from the robot, though a VR presentation, including using a VR headset or visor, is also contemplated. An operator may then issue commands or instructions to the robot based on observation of the representation presented at the remote site.

The dynamic model 282, i.e., the model maintained at the location of the robot, can be updated using data acquired at the location of the robot 12, such as from sensors 107 on the robot 12, from other sensors at the location (e.g., on-site sensors), from instrumentation or controls at the location (e.g., on-site controllers), or from any other local data generation, representation or storage systems. The dynamic model 282 may be regularly updated, such as continuously updated or periodically updated, using the data acquired at the location of the robot 12.

Figure 5:
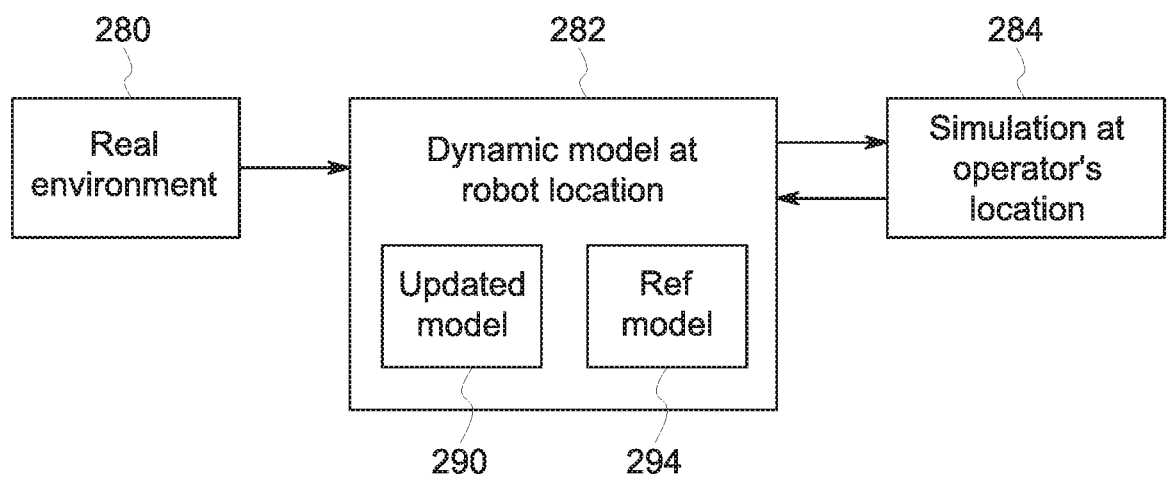
FIG. 5 depicts a block figure of the respective environments and models of FIG. 4 in which a dynamic model includes a reference model and an updated model, in accordance with aspects of the present disclosure.

With the preceding in mind and turning to FIGS. 5 and 6, in one embodiment the dynamic model 282 may be implemented over time using an updated model 290 and reference model 294, as discussed below. In such an approach, the dynamic model 282 may be generated and updated using a simulation system (e.g., a conventional simulation system or model) implemented on or at the location of the robot 12. The simulation system may be used to regularly or continuously update the locally-maintained dynamic model 282 based upon the requirements of the inspection or monitoring application and/or as newer sensor data is acquired, as discussed herein.

Figure 6:
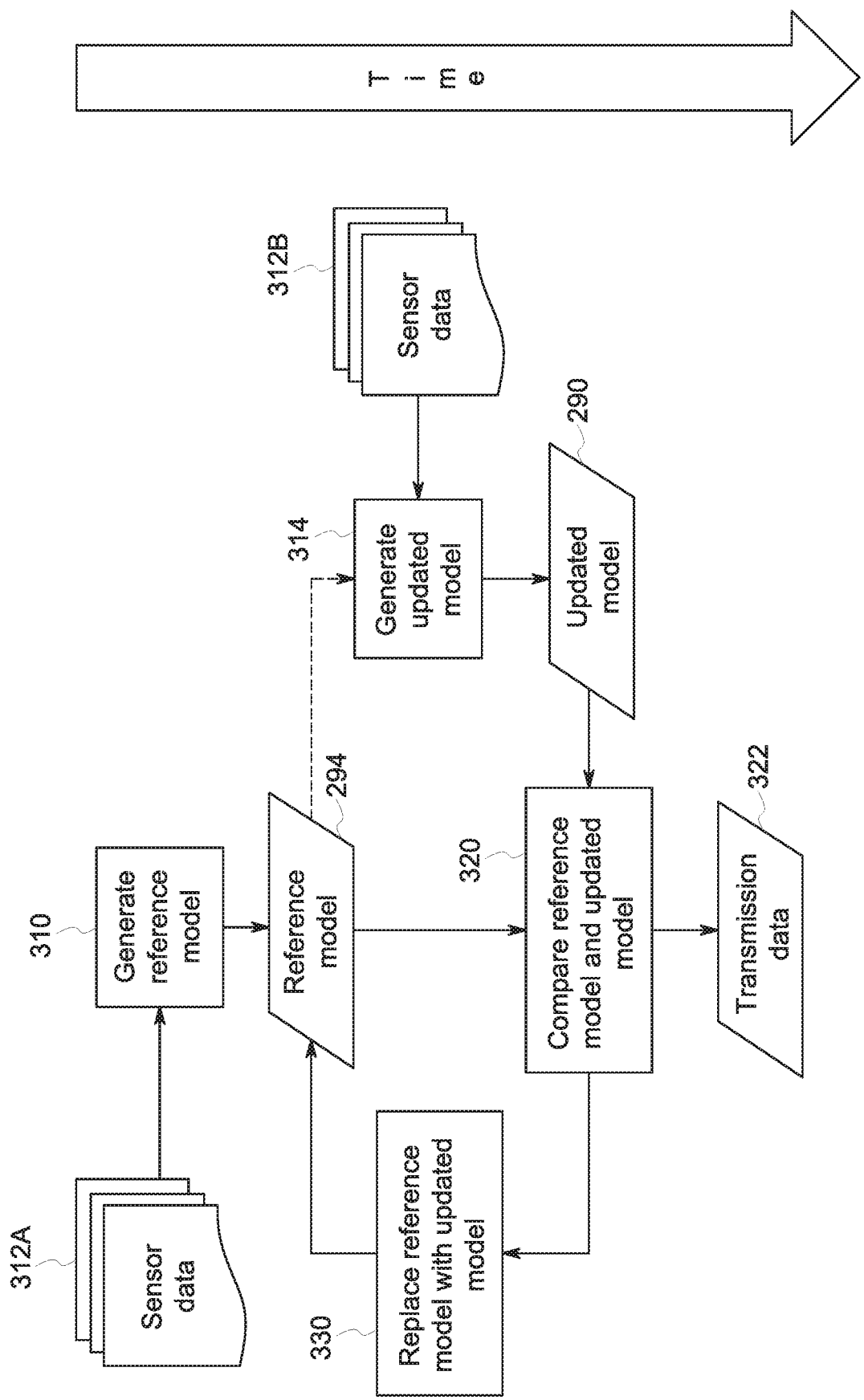
FIG. 6 depicts a flowchart of steps in the creation and updating of a dynamic model, in accordance with aspects of the present disclosure.

In accordance with the one implementation, and turning to FIG. 6, the reference model 294 is initially generated (step 310) and stored, such as from an initial set of sensor data 312A. In a subsequent update step, after a specified time interval (which may be a pre-set amount of time) or other rules specified for updating the local simulation, a second model, i.e., the updated model 290, is generated (step 314) using updated or more recent (i.e., current) sensor data 312B acquired of the real (i.e. non-simulated) environment 280 in which the robot 12 is located. The updated model 290 may be generated as a new and separate model from the reference model 294 or may be generated by modifying a copy of the reference model 294 (shown as an optional step by dotted line).

In the depicted example, the reference model 294 and the updated model 294 are compared (step 320). In one embodiment, the comparison may take the form of a subtraction operation to determine differences or changes between the updated model 290 and reference model 294. The result of the comparison step 320, as discussed in greater detail below, is a set 322 of data or changes for transmission to the remote set for model updated. For example, based on the results of the comparison 320, the simulation system may send only a subset of differences or changes to the remote model 284, which may be useful in the context of a high latency communication bridge or other instances where data transmission is constrained by latency or bandwidth. The data 322 sent to the site of the remote operator may be used to update the remote model 284 maintained at that site (such as a VR simulation) that represents the environment in which the robot 12 is presently located. An operator viewing or interacting with this remote model 284 may in turn control or operate the robot 12, causing the robot 12 to move in (e.g., change position or orientation) and/or interact with (e.g., obtain additional or alternative sensor readings, interact with a control device or instrumentation, and so forth) the environment in which the robot 12 is located.

Subsequent to a comparison step 320, the reference model 294 is replaced (step 330) with the current updated model 290, which thereby becomes the new reference model. Steps 314, 320, and 330 are repeated, with the dynamic model 282 and remote model 284 correspondingly updated in response to motion or action of the robot 12 or other changes to the environment in which the robot 12 is located such that the remote operator observes and interacts with a contemporaneous model of the robot's environment. These steps are repeated until the robotic tele-operation is completed.

While the preceding covers the basic principle of operation of the present approach, various refinements may be implemented as part of a given implementation. For example, in certain embodiments it may be useful to segment one or more of the simulation models (e.g., the dynamic model 282, the remote or operator model 284, the reference model 294, or the updated model 290) for differential processing or treatment. Such segmentation may be performed on model aspects derived from various types of sensor data and is not limited to image or visual data. for example, segmentation may be performed as well on acoustic data, infrared or temperature data, spectroscopic data, and so forth. Segmentation may be performed using any suitable approach including, but not limited to break a geometric model or model region into spaces using an octomap, identifying geometric shapes in a simulation scene, classifying sounds depending on their frequency, and so forth.

In one example, the respective model may be segmented into components (e.g., valve, switch, table, chair, conduit, and so forth), areas (e.g., in front of the robot 12, behind the robot 12, above or below the robot 12, on a lateral side of the robot 12), zones (e.g., foreground, background, hazardous zones, high-traffic employee zones, and so forth), frequencies, objects, and so forth. In general, some or all of the models may be segmented based on any useful factor or characteristic that may be used to classify model data into respective groups, which are generally referred to herein as "elements". As discussed below, certain elements may be deemed or designated as elements of interest (either ad hoc or based on prior definition) based on a given operation, situational or operational context, operator feedback or indication, machine-based rule or learning, and so forth. It should be appreciated that, as used herein, such a designation of an element being of interest is not necessarily a binary designation, but may be a matter of degree, such that some or all elements may be ranked or otherwise assigned a quantitative or qualitative indicator of relative significance or interest.

Two different types of segmentation can be performed on any given model: (1) global segmentation, and (2) robot-perspective segmentation.

As used herein, a global segmentation classifies a respective model's components (i.e., any data representation, such as geometry, sounds, colors, objects, and so forth) independently of any of the robot's states. For example, classification of model components would be independent of some or all of: the location of the robot in the real environment 180, the robot's actions, the robot's mode of operation, and so forth. For instance, an example of global segmentation may be to divide the geometric model of a modeled room into different areas, spaces, and/or objects in the room.

Conversely, as used herein a robot-perspective segmentation classifies a respective model's components depending on or based on a state of the robot 12 or the state of a sensor 107 that can change operational modes. An example of a sensor that can change operational modes would be a camera that can move (e.g., pan, tilt, zoom, and so forth). Correspondingly, the results of the robot-perspective segmentation may change when the robot 12 and/or sensors 107 change their states, such as when the robot 12 moves. An example of robot-perspective segmentation is to perform segmentation of an image or a point cloud that has been generated by a camera or a LIDAR mounted on the robot 12. That is, global segmentation is independent of what the robot 12 does or senses while robot-perspective segmentation depends on some action or movement of the robot 12 or on something sensed by the robot 12.

The segmentation operations (global or robot-perspective) can be performed using conventional data segmentation or analytic techniques. In one presently contemplated embodiment the segmentation operation may be implemented so as to receive and utilize some or all of the following inputs.

A first segmentation input may be elements, as discussed above, that may be pre-defined as being of interest (e.g., a control room, a valve, a handle, a control, and so forth) and that may be identified based on specifications assigned to the real environment 280 or a model prior to the operation of the remote representation (e.g., VR) system. For example, an initial model may be used to identify an element (e.g., a room or a tank) in the real environment 280 as an element of interest. The identified element, based on the specified interest or significance assigned to it, may be segmented in the model(s) for differential processing or treatment, such as to ensure changes to the element of interest are reflected in downstream models. In a further example, the area directly in front of a camera may be specified as being an area of interest, but the visual areas further to the sides have progressively less interest as the visual arc increases.

A second segmentation input may be an indications received from the remote human operator prior to, or while interacting with the remote model 284 (e.g., via a VR system). For example, a human operator will identify a valve or other control device or a frequency of sound as elements of interest. Segmentation of the identified element may then be performed accordingly based on the increased significance attributed to the indication.

A third segmentation input may be derived from automated rules or machine intelligence configured to automatically detect elements of interest. For example, an automated or machine intelligence rule may state that when a motor is turned on (i.e., the power switch is in the "on" position, the motor is an element of interest. Similarly, a machine learning algorithm may labels an element as being of interest when a change is detected with respect to the element. Based on such machine-intelligence or automated rules, an element identified by such routines may be segmented based on the rule-based identification.

A fourth segmentation input may be derived based on context-specific information that m ay be used to classify elements. For example, in a tele-operation context in which a remote operator is driving a rolling robot 12, the path ahead of the robot 12 may be designated an element of interest due to the context provided by the driving operation. By way of further example, a remote operator instructing the robot 12 to turn a valve may result in a hissing sound (e.g., steam or gas escaping) being designates an acoustic elements of interest in view of the operational context.

As noted above, for various segmented elements, the degree of interest or significance with respect to respective elements may be binary (i.e., "of interest"/"not of interest") or a matter of degree (e.g., critical, high, high-moderate, moderate, low-moderate, low, or no significance or ranked on a numeric scale, such as from 1-10).

After segmentation operations are complete, the level of interest for some or all of the different elements in a given model may be used to individually assign a resolution level. As used herein, a resolution level is a metric that indicates how much detail needs to be included in the data representation of the corresponding real element. For example, an element can be a chair present in the real environment 280. The resolution level for the chair in the model(s) can be assigned a "low resolution", such as due to being deemed of low or no interest. Such a resolution may correspond to a metric suitable to an representational quality in the model, such as "100 cloud points per cubic inch" in the context of a visual representation based on a point cloud. As noted above, the relative significance or interest of an element may change, such as due to receiving an operator indication of interest or the element becoming of interest in view of an operation being performed by the robot 12 (such as a navigation operation). As a result, a resolution model assigned for a given element may also change in view of changes in the significance or interest designated for a given element.

Figure 7:
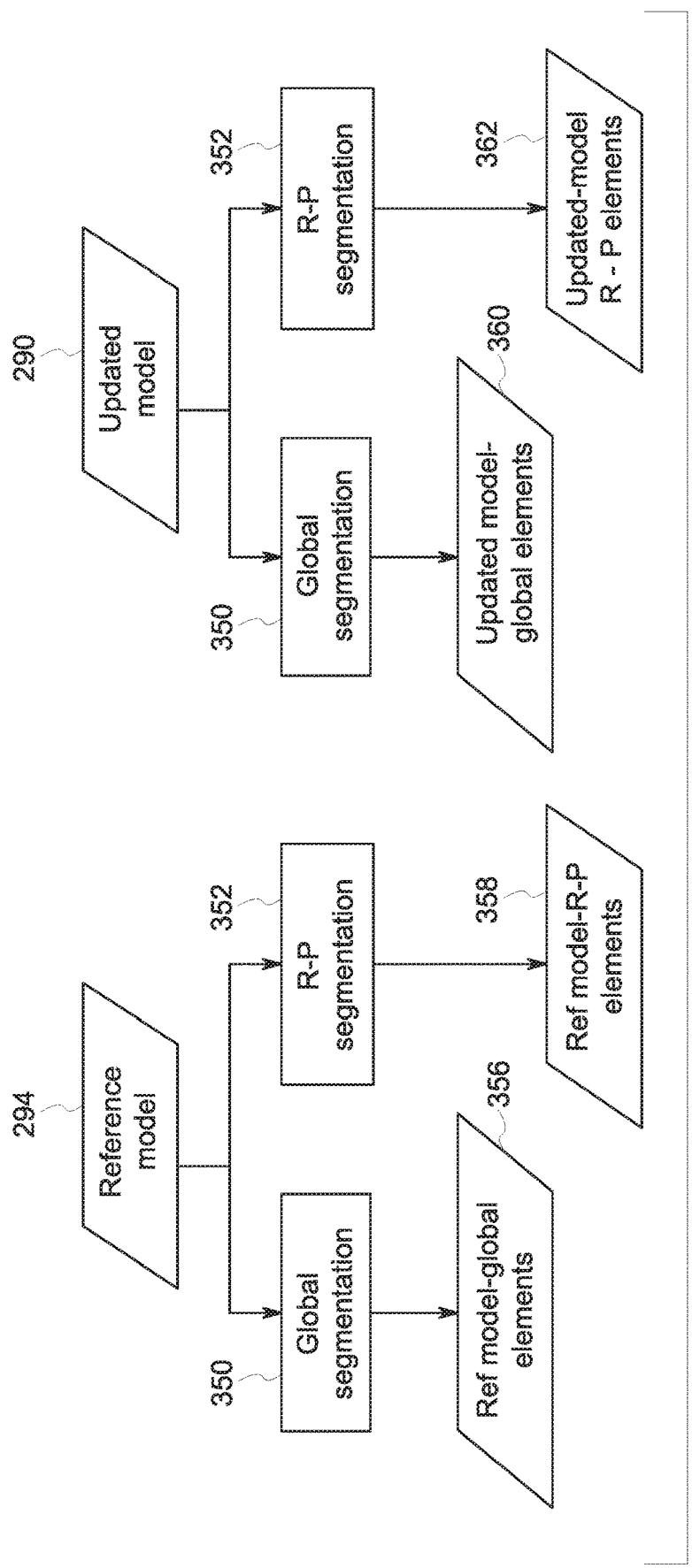
FIG. 7 depicts a flowchart of steps in the segmentation of a dynamic model, in accordance with aspects of the present disclosure.
Figure 8:
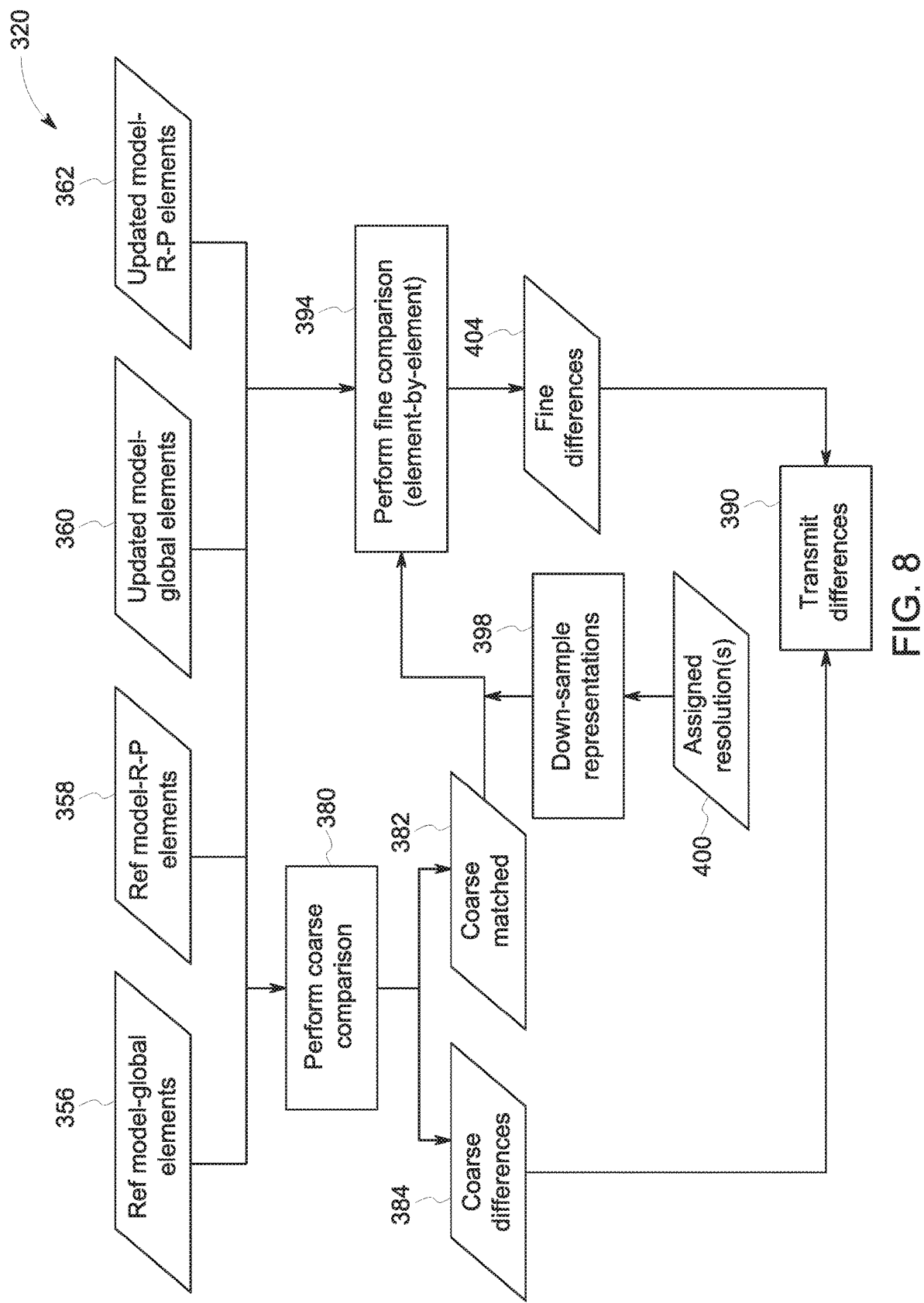
FIG. 8 depicts a flowchart of steps in the comparison of elements in an update of a dynamic model, in accordance with aspects of the present disclosure.

With the preceding in mind, and turning to FIGS. 7-8, in one embodiment, generation of a remote simulation or model for reference by an operator of a robot may operate as follows. In particular, FIG. 7 depicts steps in one implementation of performing the comparison step 320 of FIG. 6 to generate a limited set of change data to send to a remote simulation system (e.g., a VR system). FIG. 8 depicts comparison steps using segmentation results generated in FIG. 7.

As part of an initial step, the remote simulation system generates a remote model 284 (i.e., operator model) at the location of an operator different from the location of the robot 12. The remote model 284 corresponds to the dynamic model 282 and thus, initially, may be based on the current or initial reference model 294 at the time the remote model 284 is initiated. For example, the remote model 284 and dynamic model 282 may contain the same data or, alternatively, the remote model 284 may contain a subset of the data of the corresponding dynamic model 282 based upon selection of data deemed most useful to the remote operator.

The dynamic model 282 is created and updated as discussed generally with respect to FIG. 6. As part of the more detailed comparison and update operation shown in FIG. 7 global and robot perspective segmentation operations are shown as part of the comparison process. In this example, for a given update round, the current reference model 294 is segmented globally (block 350) and from the robot perspective (block 352) to generate, respectively, a set of reference model global elements 356 and a set of reference model robot-perspective elements 358. Similarly, for the same update round, the current updated model 290 is segmented globally (block 350) and from the robot perspective (block 352) to generate, respectively, a set of updated model global elements 360 and a set of updated model robot-perspective elements 362.

Turning to FIG. 8, the segmented elements may undergo a comparison step 320 which, in the depicted example of an implementation, includes both coarse and fine comparison steps. With respect to the depicted coarse comparison step 380, this step compares the elements identified in the reference model 294 and updated model 290 to determine which elements are present in both models and which are present in only one of the two models. Elements present in both models are determined to be matched (coarse matched 382). Elements present in only one of the two models are determined to be difference (coarse differences 384). The differences 384 (corresponding to a new element present in the updated model 290 but not in the reference model 294 or to an absent element that was present in the reference model 294 but which is missing from the updated model 290) are included in a remote model update to be transmitted (step 390) to the simulator generating and/or maintaining the remote model 284.

The fine comparison step 394, in one implementation, may compare the matched elements 382 determined in the coarse comparison. In this example, the matched elements 382 undergo a fine comparison 394 on an element-by-element basis in which down-sampled representations of each element are compared for differences (i.e., changes between the reference and updated models). By way of example, each element may be down-sampled (step 398) to the resolution level 400 assigned to that respective element, which may be based on the interest in or significance of the element, as discussed herein. The down-sampled representations of the elements from each of the reference and updated model may be compared element-by-element. Those elements exhibiting differences between how they appear in the updated model 290 from how they appear in the reference model 294 are deemed different (fine differences 404). It may also be noted that an element may also be deemed to have changed between the reference and update models due to a change interest or significance in that mode, resulting in a change in assigned resolution which may warrant an update being sent to the remote site with respect to that element. As with the coarse changes, elements determined to be different in the fine comparison are included in the remote model update transmitted (step 390) to the simulator generating and/or maintaining the remote model 284 to update the remote model. The respective comparison and transmission steps may be repeated for each update of the dynamic model 282 until such time as the robotic tele-operation is concluded.

As may be appreciated, the present approach ensures that only the elements that have changed sufficiently (in view of the assigned resolution based on interest in a respective element) will be transmitted to the remote site to update the remote model at each step. This reduces the amount of data sent in comparison to re-sending the entire model each time.

Technical effects of the invention include increased accuracy of the remote representation using in a robotic tele-operation. Further effects include increased reliability and improved quality of human actions using tele-operation. In addition, technical effects include reduced bandwidth needs for data transfer in tele-operations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An asset inspection system, comprising:
 a robot configured to be operated from a remote location, the robot comprising:
  one or more sensors;
  a processing component configured to receive sensed data from the one or more sensors and to generate and maintain a dynamic model of an environment based on the sensed data, wherein maintaining the dynamic model comprises repeatedly comparing an updated model of the environment generated based on the sensed data and a reference model of the environment generated prior to the updated model to identify element-by-element changes to the dynamic model over time, wherein the element-by-element changes consist of element differences identified between the reference model of the environment and the updated model of the environment during each comparison of the reference model and the updated model;
  a communication interface configured to repeatedly communicate transmission data consisting essentially of the element-by-element changes from the processing component to the remote location; and
 a simulator at the remote location and configured to receive the transmission data consisting essentially of the element-by-element changes from the robot, wherein the simulator is configured to maintain a remote model of the environment based on the element-by-element changes sent by the robot.

2. The asset inspection system of claim 1, wherein generating and maintaining the dynamic model comprises:
 initially generating the reference model based on initial sensed data;
 generating or updating the updated model based on subsequently acquired sensed data;
 comparing a current updated model of the environment with a current reference model of the environment to identify the element-by-element changes; and
 replacing the current reference model with the current updated model after each comparison.

3. The asset inspection system of claim 1, wherein the simulator is a virtual reality (VR) simulator and wherein the remote model is a VR model.

4. The asset inspection system of claim 1, wherein the processing component is further configured to segment the reference model and the updated model to identify the element-by-element changes.

5. The asset inspection system of claim 4, wherein the processing component segments both the reference model and the updated model using a global segmentation operation and a robot-perspective segmentation operation to identify elements compared in determining the element-by-element changes.

6. The asset inspection system of claim 1, wherein each element of the element-by-element changes has an associated level of interest corresponding to a resolution level corresponding to a metric specifying a level of detail of a representation of the element.

7. The asset inspection system of claim 6, wherein the associated level of interest is binary or a matter of degree.

8. The asset inspection system of claim 6, wherein the associated level of interest is assigned by one or more of a prior designation, an operator input, an automated rule or machine intelligence output, or a context-specific determination.

9. The asset inspection system of claim 1, wherein comparing the updated model and the reference model comprises:
   performing a coarse comparison of elements segmented in the reference model and the updated model, wherein the coarse comparison generates a set of coarse element differences comprising elements present in only one of the reference model or the updated model;
   wherein the set of coarse element differences is included in the element-by-element changes communicated to the remote location.

10. The asset inspection system of claim 1, wherein comparing the updated model and the reference model comprises:
   performing a fine comparison of elements present in the reference model and the updated model, wherein the fine comparison generates a set of fine element differences comprising elements that differ between the reference model and the updated model as a respective assigned resolution;
   wherein the set of fine element differences is included in the element-by-element changes communicated to the remote location.

11. A method for monitoring an environment, comprising:
   generating and maintaining, via a processing component of a robot, a dynamic model of the environment based on sensed data acquired by one or more sensors of the robot, wherein maintaining the dynamic model comprises repeatedly comparing an updated model of the environment generated based on the sensed data and a reference model of the environment generated prior to the updated model to identify element-by-element changes to the dynamic model over time, wherein the element-by-element changes consist of element differences identified between the reference model of the environment and the updated model of the environment during each comparison of the reference model and the updated model;
   repeatedly communicating transmission data consisting essentially of the element-by-element changes from the processing component of the robot to a remote location; and
   maintaining a remote model of the environment at the remote location based on the element-by-element changes sent by the robot.

12. The method of claim 11, wherein generating and maintaining the dynamic model comprises:
   initially generating the reference model based on initial sensed data;
   generating or updating the updated model based on subsequently acquired sensed data;
   comparing a current updated model of the environment with a current reference model of the environment to identify the element-by-element changes; and
   replacing the current reference model with the current updated model after each comparison.

13. The method of claim 11, further comprising segmenting the reference model and the updated model to identify the element-by-element changes.

14. The method of claim 13, wherein both the reference model and the updated model are segmented using a global segmentation operation and a robot-perspective segmentation operation to identify elements compared in determining the element-by-element changes.

15. The method of claim 11, wherein each element of the element-by-element changes has an associated level of interest corresponding to a resolution level corresponding to a metric specifying a level of detail of a representation of the element.

16. The method of claim 15, wherein the associated level of interest is binary or a matter of degree.

17. The method of claim 15, wherein the associated level of interest is assigned by one or more of a prior designation, an operator input, an automated rule or machine intelligence output, or a context-specific determination.

18. The method of claim 11, wherein comparing the updated model and the reference model comprises:
   performing a coarse comparison of elements segmented in the reference model and the updated model, wherein the coarse comparison generates a set of coarse element differences comprising elements present in only one of the reference model or the updated model;
   wherein the set of coarse element differences is included in the element-by-element changes communicated to the remote location.

19. The method of claim 11, wherein comparing the updated model and the reference model comprises:
   performing a fine comparison of elements present in the reference model and the updated model, wherein the fine comparison generates a set of fine element differences comprising elements that differ between the reference model and the updated model as a respective assigned resolution;
   wherein the set of fine element differences is included in the element-by-element changes communicated to the remote location.

20. The asset inspection system of claim 1, wherein the element differences are indicative of one or more first features of the environment that are represented in the updated model and absent in the reference model, one or more second features of the environment that are absent in the updated model and represented in the reference model, or both.

* * * * *